Dec. 30, 1924.                                                1,520,718

F. S. KOCHENDORFER ET AL
STRAND OR CORD WORKING MECHANISM
Filed July 31, 1920        6 Sheets-Sheet 1

Inventors
Frederic S. Kochendorfer
John N. Selvig
by
Atty.

Dec. 30, 1924.                                                    1,520,718
F. S. KOCHENDORFER ET AL
STRAND OR CORD WORKING MECHANISM
Filed July 31, 1920          6 Sheets—Sheet 2

Inventors
Frederic S. Kochendorfer
John N. Selvig
by G. M. Campbell
Atty.

Dec. 30, 1924.

F. S. KOCHENDORFER ET AL

1,520,718

STRAND OR CORD WORKING MECHANISM

Filed July 31, 1920   6 Sheets-Sheet 5

Inventors
Frederic S. Kochendorfer
John N. Selvig
by G. M. Campbell
Atty.

Patented Dec. 30, 1924.

1,520,718

UNITED STATES PATENT OFFICE.

FREDERIC S. KOCHENDORFER, OF NEWTON, IOWA, AND JOHN N. SELVIG, OF CHICAGO, ILLINOIS, ASSIGNORS TO WESTERN ELECTRIC COMPANY, INCORPORATED, OF NEW YORK, N. Y., A CORPORATION OF NEW YORK.

STRAND OR CORD WORKING MECHANISM.

Application filed July 31, 1920. Serial No. 400,301.

*To all whom it may concern:*

Be it known that we, FREDERIC S. KOCHENDORFER and JOHN N. SELVIG, a citizen of the United States, and a subject of the King of Norway, respectively, residing at Newton, in the county of Jasper and State of Iowa, and at Chicago, in the county of Cook and State of Illinois, respectively, have invented certain new and useful Improvements in Strand or Cord Working Mechanism, of which the following is a full, clear, concise, and exact description.

This invention relates to a strand or cord working mechanism, and has for its principal object the provision of a mechanism by means of which flat tinsel strands of small cross-sectional area and of uniform size may be rapidly and economically produced. It will be apparent, however, that features of this invention are readily applicable to other mechanisms and capable of use in many ways other than that described in this particular embodiment of the invention.

One of the features of this invention relates to the means provided for maintaining a constant tension on a strand traveling between a supply and a take-up spool. In the preferred form of this invention both the supply and take-up spools are power driven and pivotal arms are provided over which the strand travels and which operate in response to increase or decrease in tension to vary the speed of drive of the spools. Another object of the invention is the provision of a unitary driving mechanism for the take-up and distributing mechanisms with means for varying the speed thereof responsive to the tension on the strand.

Another feature of this invention provides for the stopping of the spools when either the wire or tinsel breaks. This may be accomplished by the action of a lever arm which, when the wire breaks, acts to disengage the friction drive and apply a brake, and in the case of the tinsel breaking, tripping a clutch which stops the machine. Also a mechanism is provided for stopping the machine when a spool is completely wound.

The invention is further characterized by an improved method of and mechanism for supporting and removing an out-board bearing for the supply spool shaft and by various details and combination of parts as will hereafter more fully appear.

In the drawings illustrating this invention

Figures 1, 9:
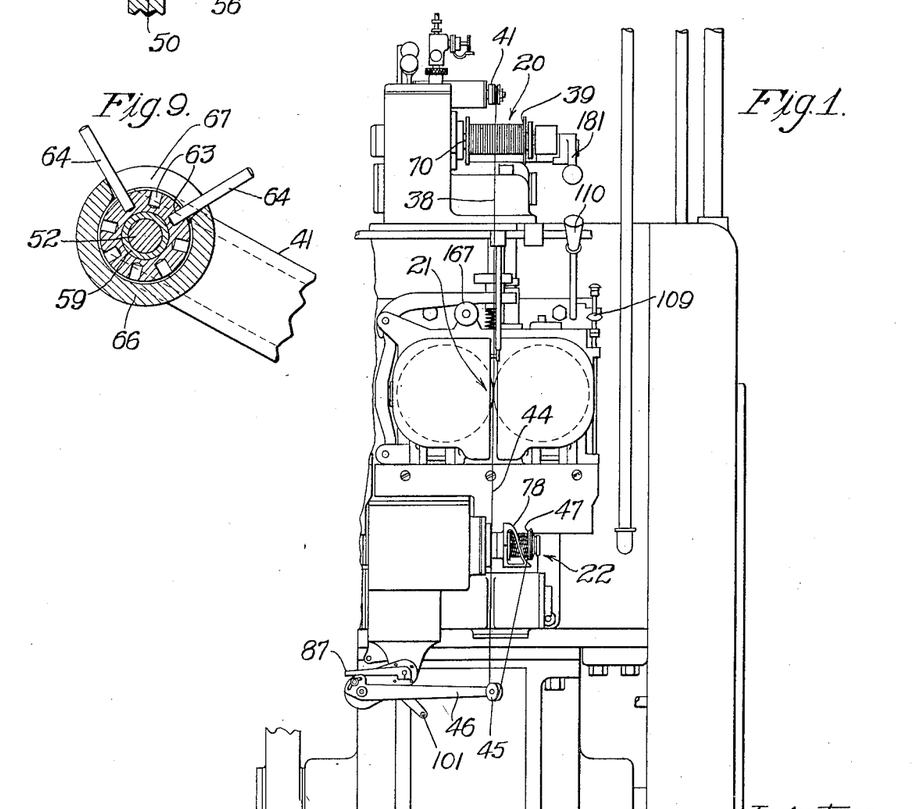
Fig. 1 is a fragmentary front view of a tinsel rolling machine showing one unit of a machine embodying the features of this invention.
Fig. 9 is a section taken on the line 9—9 of Fig. 8.

As shown in the drawings, with the exception of Fig. 1, the machine frame has been omitted except as a mounting means for parts concerned in this invention. In its preferred form the machine is provided with a number of independent rolling units, half of which are mounted on each side of the machine frame.

Figure 4:
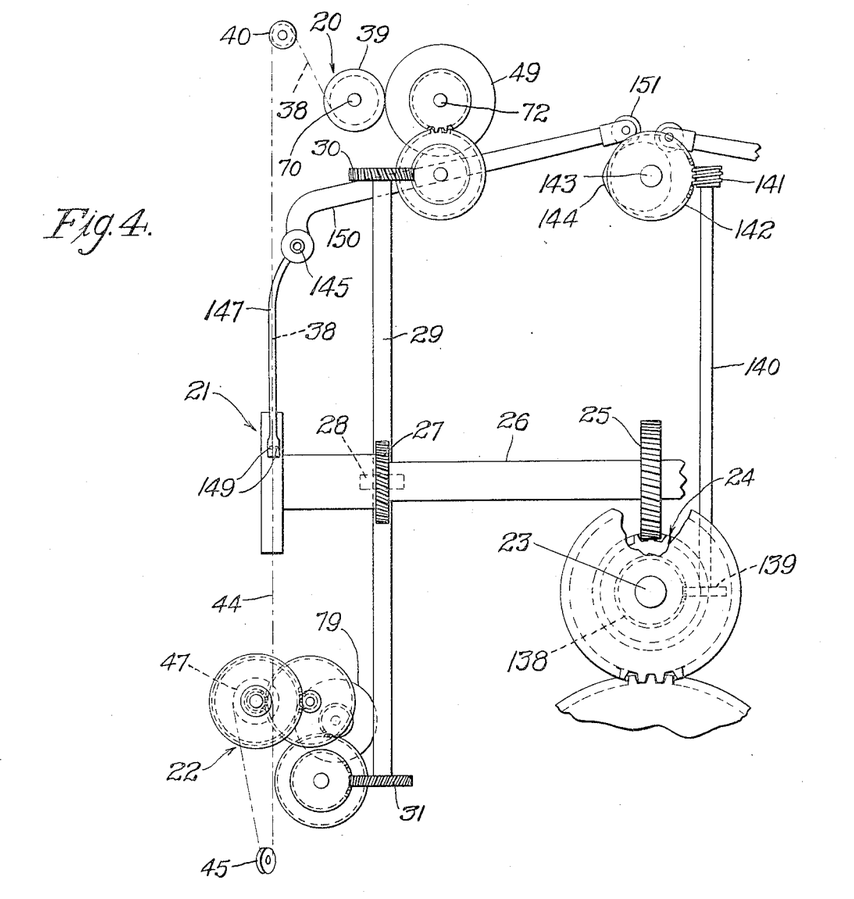
Fig. 4 is a diagrammatic view of the driving mechanism for the supply and take-up spools, rollers, and a mechanism for causing the wire to traverse the faces of the rollers.

Each complete rolling unit comprises three sub-units—a supply spool unit 20, a rolling unit 21, and a take-up spool unit 22. These sub-units are mounted independently of each other in such a way that any one can be removed without disturbing the others. As best shown in Fig. 4, each complete unit is driven from a common drive shaft 23 running the length of the machine and driven from a motor through suitable intermediate gearing. Mounted on the shaft 23 at spaced intervals are gears such as 24, one for each complet unit, each of which meshes with a gear 25 mounted on a shaft 26 which drives the roller sub-unit 21. Mounted on the shaft 26 intermediate its ends is a gear 27 which meshes with a gear 28 to drive a vertical shaft 29 which at its ends carries gears 30 and 31 for driving the supply and take-up spool units 20 and 22 respectively.

Figures 1, 2, 3, 10, 11:
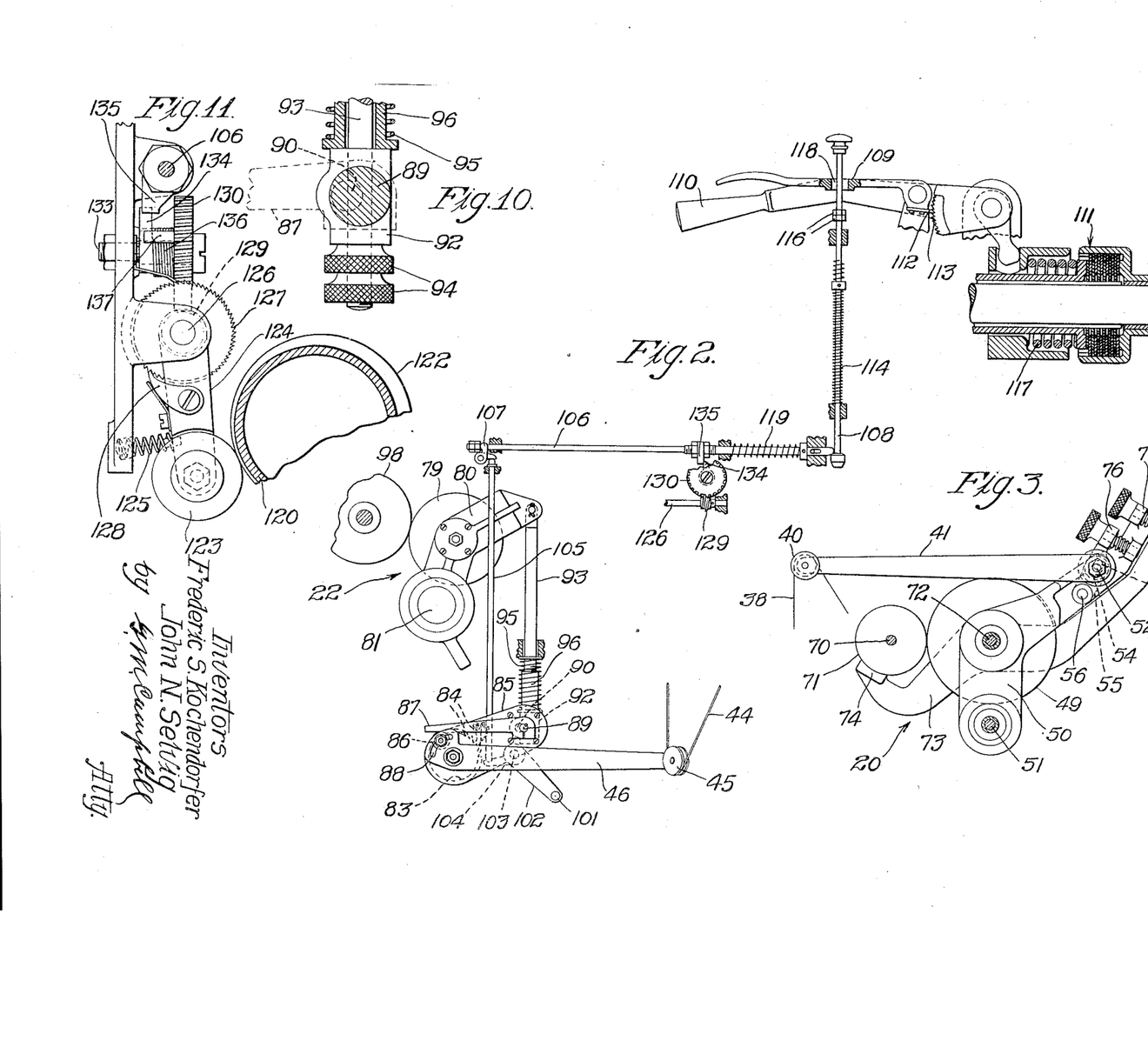
Fig. 2 is a diagrammatic view showing the take-up mechanism and the mechanism for tripping the clutch when the tinsel breaks. The take-up lever arm is shown in a distorted position with relation to the take-up spool shaft as shown in Fig. 1.
Fig. 3 is a side view of the supply spool mechanism, surrounding parts of the machine being omitted.
Fig. 10 is an enlarged detail view partly in section of a portion of the mechanism operated by the take-up spool lever arm for causing the tension on the tinsel to be kept constant.
Fig. 11 is a side view of the mechanism for stopping the machine when a spool is completely wound.

The wire 38 is fed from the under side of a power driven supply spool 39 (as shown in Figs. 1 and 4 to a roller 40 on the end of the tension lever arm 41 located above the spool 39. After passing over the roller 40 the wire passes down between the rollers of the rolling unit 21 and is rolled into tinsel at a constant speed. The tinsel 44 then passes down and under a roller 45 on the end of a second tension lever arm 46 to a take-up spool 47. Referring to Figs. 3 and 4, the gear 30 on the supply end of the shaft 29 drives suitable gearing which causes a friction wheel 49 to be driven at a constant speed. The friction wheel 49 is carried in a pivotally supported frame 50 which is pivoted at a point 51 on the frame of the machine. The tension lever arm 41 is keyed to one end of a pin 52 which has eccentrically mounted at its other end a roller 53 which rolls in a slot 54 in a bracket 55 pivoted at the point 56 to the supporting frame 50. The tension lever arm 41 is held up by a spring 57 one end of which engages a head 58 on a sleeve 59 which surrounds the greater part of the pin 52 and is affixed thereto. The other end of the spring 57 engages a collar 60 which is rotatable on the sleeve 59. The collar 60 is provided with radially arranged holes 63—63 on its periphery into which pins 64 loosely fit. Surrounding the spring 57 is a sleeve 66 which is integral with the supporting frame 50. The pins 64 extend through a slot 67 in the sleeve 66 and bear on opposite ends thereof.

The spring 57 acting on the lever arm 41 keeps the wire 38 under tension. The tension to be used is determined by the size of the wire to be rolled. To regulate this tension one of the pins 64 is removed and the other pin is moved in the slot 67 which will either decrease or increase the tension of the spring 57 depending in which direction the collar 60 is turned. After the adjusting of the spring 57 the other pin is put back into one of the holes 63 which locks the collar 60 in position.

Directly in front of the friction wheel 49 is the supply spool 39 mounted on a shaft 70 which is rotated by a friction wheel 71 mounted thereon and intermittently driven by the friction wheel 49. Pivotally supported on a shaft 72 which also supports the friction wheel 49 is a brake arm 73 carrying at its lower end a brake shoe 74 which engages the friction wheel 71 whenever the friction wheel 49 is moved from contact with the friction wheel 71.

The speed of the rollers of the rolling unit 21 being constant and the diameter of the supply spool decreasing as the wire is fed therefrom makes it necessary that the supply spool revolve faster so that a constant tension will be kept on the wire to prevent breakage thereof. The movement of the lever arm 41 downward caused by the increased tension put on the wire through the constant drawing speed of the rollers and the decreasing diameter of the wire on the supply spool causes the eccentrically mounted roller 53 to bear forward or to the left, as shown in Fig. 3, in the slot 54 in the bracket 55. This movement of the roller 53 moves the bracket 55 in the same direction about its pivot 56 which through an adjustable connection 76 at its upper end connecting with the supporting frame 50 moves it forward. The friction wheel 49 is thereby moved into closer engagement with the friction wheel 71 which causes it to revolve faster, thereby keeping a substantially uniform tension on the wire. The movement of the friction wheel 49 is very slight and a movement in the reverse direction takes place almost immediately when the speed is increased to a point where the wire is being fed to the rollers faster than the drawing speed of the rollers.

There is a continuous movement of the driving friction wheel 49 into and out of contact with the friction wheel 71 during the rolling of the wire.

In case of the wire breaking or of the supply spool feeding the wire to the rollers faster than it is drawn by the rollers, the lever arm 41 will move up under the action of the spring 57. This causes the eccentrically mounted roller 53 to bear backward or in the reverse direction from that in which it bears when the lever arm 41 moves down. This movement causes the friction wheel 49 to be moved out of engagement with the friction wheel 71, and through an adjustable connection 77 connects the supporting frame 50 and the brake arm 73 to move the brake shoe 74 into a braking contact with the friction wheel 71 just after the friction wheels 49 and 71 are disengaged. By adjusting the connections 76 and 77 the application of the brake shoe 74 can be suitably timed.

After leaving the rollers the tinsel 44 passes down and under the roller 45 on the end of the take-up tension lever arm 46 of take-up spool unit 22 and onto the take-up spool 47. The tinsel is distributed on the spool by a double faced cam 78 which is mounted concentrically with and surrounds the take-up spool or reel. The distributing cam is driven at a speed about one twentieth the speed of the take-up spool and in synchronism therewith. This distributing mechanism is similar to that described in Patent 1,429,493, dated September 19, 1922, which will be described briefly hereafter.

Referring to Figs. 1, 2, and 4, the gear 31 on the take-up spool end of the shaft 29 drives suitable gearing which causes a friction wheel 79 to be driven at a constant speed. The friction wheel 79 is carried in a pivotally supported frame 80 which is pivoted at a point 81 on the frame of the machine. The arm 46 is under tension to move down, and this movement is caused by the action of a clock spring within a cup 83. The tension of the clock spring is adjusted by a ratchet and pawl mechanism 84. The action of the clock spring on the lever arm 46 puts a tension on the tinsel as it is being wound by the take-up spool 47.

The lever arm 46 is pivoted to a bracket 85 and on the same axis as the clock spring and carries a roller 86 which contacts with a short lever arm 87 pivoted from the bracket 85 above and to one side of the axis of the lever arm 46. The roller bearing is mounted in a slot 88 in the lever arm 46 and is adjustable therein. The short lever arm 87 is keyed to one end of a shaft 89 which at its other end is equipped with a crank portion 90 from which is pivoted a sleeve 92. Pivoted to the frame 80 is a rod 93 which extends downwardly and through the sleeve 92. Thumb nuts 94 on the lower end of the rod 93 secure the sleeve 92 on same. A spring 95 is mounted between an enlarged diameter of a second sleeve 96 and a portion of the machine frame around the rod 93 and acts on the lever arm 87 to keep it in contact with the roller 86. The sleeve 96 is screw threaded to the rod 93 at its upper portion and when moved up on the rod 93 frees the short lever arm 87 of the force of the spring 95. By adjusting the roller 86 in the slot 88 the movement of the crank 90 is regulated and thereby the contact between the friction wheel 79 and a friction wheel 98 mounted on the take-up spool shaft.

As the speed of the rollers of the rolling unit 21 is constant and the diameter of the take-up spool increasing as the tinsel is wound thereon, it becomes necessary that the take-up spool revolve at a slower speed so that the tinsel will be under constant tension to prevent breakage thereof. The movement of the lever arm 46 upward, caused by the increased tension put on the tinsel through the constant speed of the rollers and the increasing diameter of the take-up spool, causes the short lever arm 87 to move down at the end which contacts with the roller 86 through the action of the spring 95. This movement turns the shaft 89 and through the crank 90 thereon moves the sleeve 92 down, which through the thumb nuts 94 and the rod 93 moves the pivoted frame 80 carrying the driving friction wheel 79 away from the friction wheel 98. This movement is very slight, and a movement in the reverse direction takes place almost immediately when the speed is so reduced as to cause a slackness in the tinsel. There is a continuous movement of the driving friction wheel 79 into and out of contact with the friction wheel 98 during the winding of the tinsel.

The means for driving the distributing mechanism in synchronism with the speed of the take-up spool 47 which as heretofore described must be driven at a slower speed as the diameter of the material wound upon the spool increases so that the tinsel will always be under a constant tension to prevent breakage thereof, or at a greater speed whenever a slackness occurs in the tinsel after leaving the rolling unit 21 for any reason, will now be described.

Figure 17:
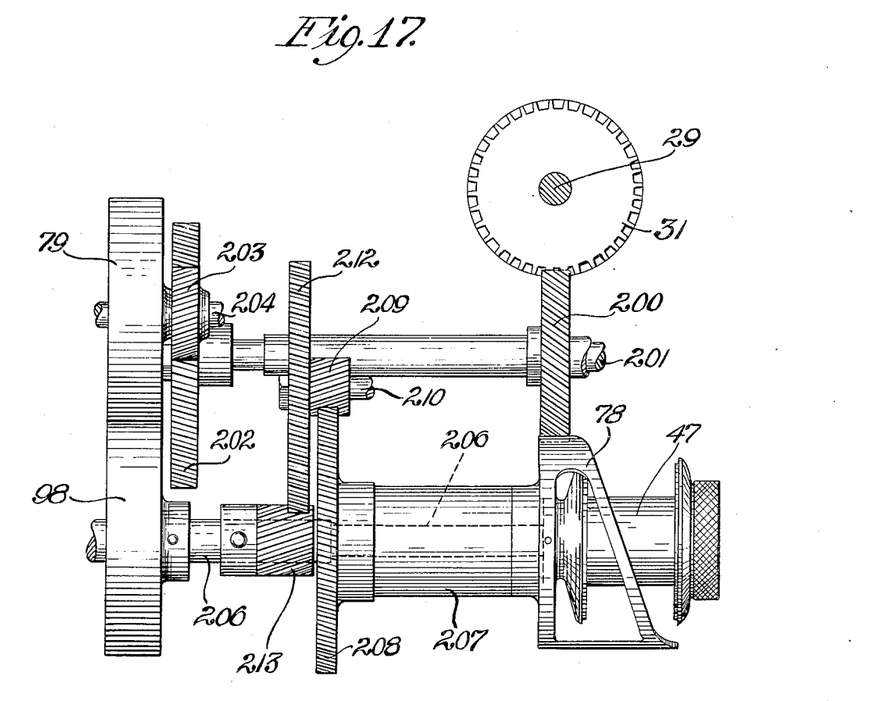
Fig. 17 is a detail plan view of the take-up spool distributing mechanism and the driving mechanism therefor, surrounding parts of the machine being omitted.

Referring to Figs. 4 and 17 in which surrounding parts of the machine have been omitted for clearness, 200 indicates a gear in driving engagement with the gear 31 carried upon the vertical driving shaft 29. The gear 200 is secured to a shaft 201 carrying at one end a gear 202 which meshes with a pinion 203 secured to a shaft 204 carrying the friction wheel 79 which is mounted upon the pivotally supported frame 80, (Fig. 2). The take-up spool 47 is suitably mounted for removal and replacement upon a shaft 206 carrying the friction wheel 98. Surrounding the take-up spool 47 is the double-faced cam 78 for distributing the tinsel upon the spool 47 in smooth even layers. Reference may be had to the heretofore mentioned patent for more detailed description thereof. The cam 78 is suitably secured to a sleeve 207 rotatably mounted upon the shaft 206 and carries a gear 208 meshing with a pinion 209 secured to an idler shaft 210. Secured to the idler shaft 210 is a gear 212 which meshes with a pinion 213 carried upon the shaft 206. The arrangement of the gears and pinions 208, 209, 212, and 213 is such that the sleeve 207 carrying the cam 78 will be driven at about one-twentieth the speed of and in the same direction as the shaft 206.

It will thus be seen that as the speed of the take-up spool 47 is varied due to the varying engaging pressures between the friction wheels 79 and 98 in turn caused by increased tension or slackness in the tinsel, that the speed of the tinsel distributing cam 78 will also vary in synchronism therewith but always at a speed one-twentieth thereof.

If the tinsel should break from any cause the lever arm 46 will drop down about its pivot due to the action of the clock spring and the force of gravity and strike a pin 101 in an arm 102 which is secured to a rod 103 carried by the bracket 85. Fastened to the other end of the rod 103 is a second arm 104 which when the arm 102 moves down, moves up and lifts a vertical rod 105 which is in engagement with it. The rod 105 in moving up causes a horizontal rod 106 to be moved through the co-operation of a pawl 107. The rod 106 in moving unlatches a spring plunger 108 which trips a stop lever 109. The stop lever 109 controls a starting lever 110 by which a friction disk clutch 111 is operated.

The stop lever 109 is pivoted to the housing of the rolling unit 21 and is equipped with a tooth 112 which engages a series of notches 113 on the starting lever 110. The spring plunger 108 is moved up under the action of a spring 114 when the horizontal rod 106 moves from over a head fixed on it, and check nuts 116 mounted thereon come into contact with the stop lever 109 to turn it about its pivot. This movement draws the tooth 112 from one of the notches 113 after which the clutch will be disengaged by the action of a spring 117. The spring plunger 108 projects through an opening 118 in the stop lever and on its end is equipped with a knob for manually moving it down to its normal position. The horizontal rod 106 is normally held in engagement with the spring plunger 108 by a suitably mounted spring 119.

Figure 12:
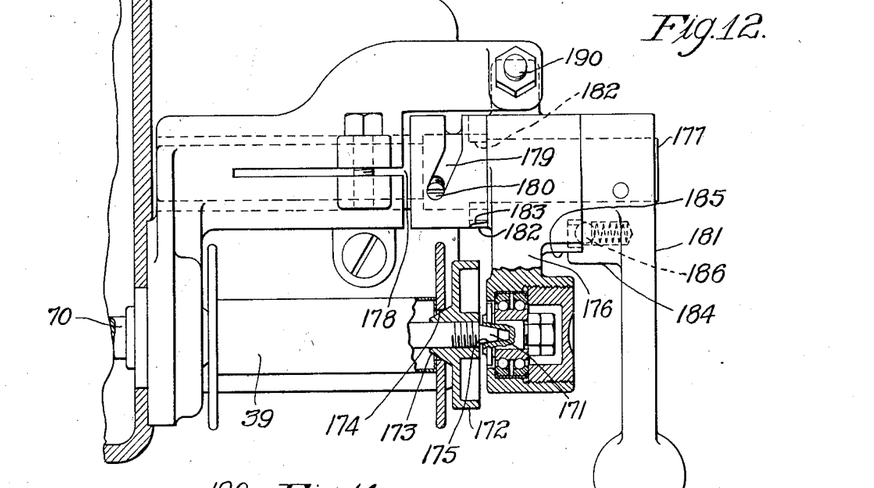
Fig. 12 is a plan view partly in section of the mechanism for removably supporting the supply spool bearing.

Figs. 11 and 12 illustrate the mechanism for stopping the machine when a spool is completely wound. Mounted on a sleeve 120 of the distributing cam 78 which is driven at about one-twentieth the speed of the take-up spool is a cam 122. The cam 122 engages a roller 123 on the end of a pivoted pawl lever 124 and is kept in contact therewith by a spring 125. The pawl lever 124 is pivoted loosely on a shaft 126 which has mounted thereon a ratchet wheel 127. A pawl 128 mounted on the lever 124 intermediate its pivot point and the roller 123 engages the teeth on the ratchet wheel 127. Also mounted on the shaft 126 is a worm 129 which meshes with a worm gear 130 on a pin 133. For every revolution of the cam 122 the ratchet wheel 127 is rotated one tooth and at the end of a complete revolution of the ratchet wheel a finger 134 loosely mounted on the pin 133 comes into engagement with a finger 135 secured on the horizontal rod 106 and moves it to release the spring plunger 108 which trips the clutch to stop the machine. A spring 136 suitably mounted on the pin 133 keeps the finger 134 in engagement with the finger 135 and a pin 137 mounted on the worm gear 130 comes into engagement with the finger 134 and moves it forward which causes the clutch to be tripped.

Figures 5, 6, 7, 15:
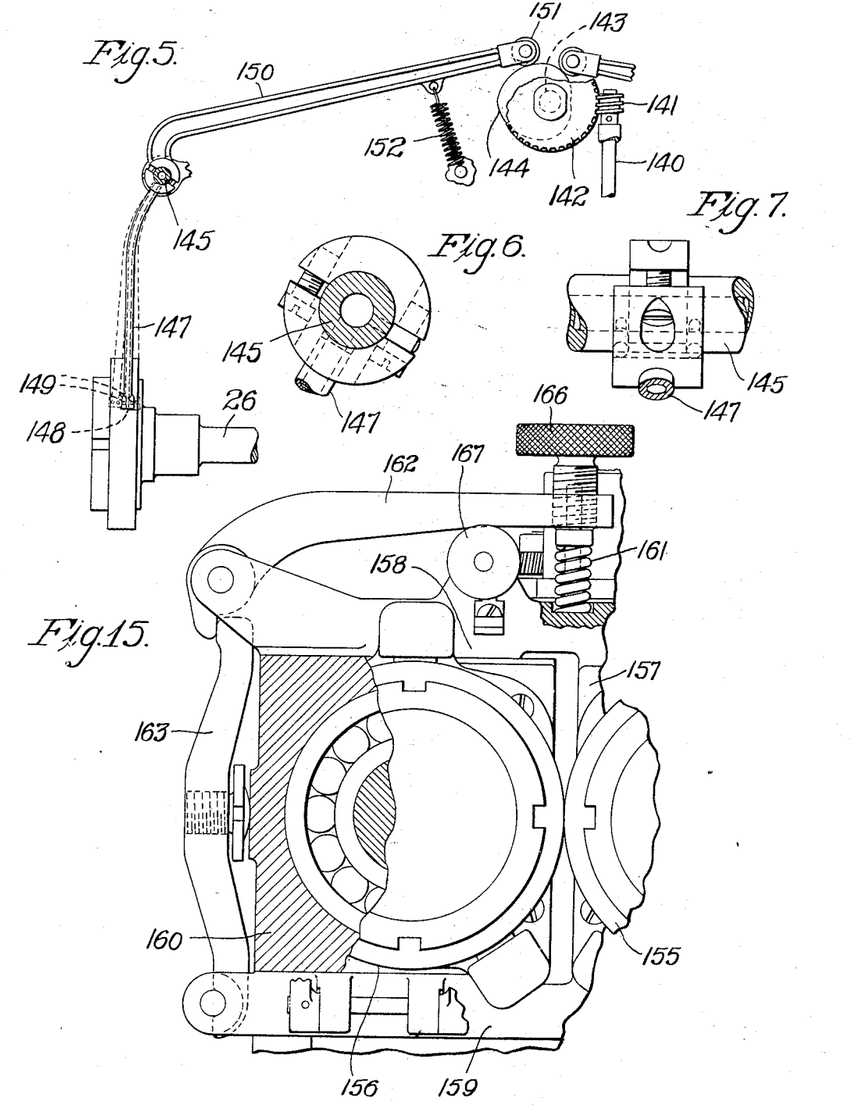
Fig. 5 is a detail view of the mechanism for causing the wire to traverse the faces of the rollers and for supplying air thereto.
Fig. 6 is an enlarged detail view of a portion of Fig. 5.
Fig. 7 is a front view of Fig. 6.
Fig. 15 is a fragmentary front view of the rollers partly in section showing mechanism for exerting pressure between the rollers.
Figure 8:
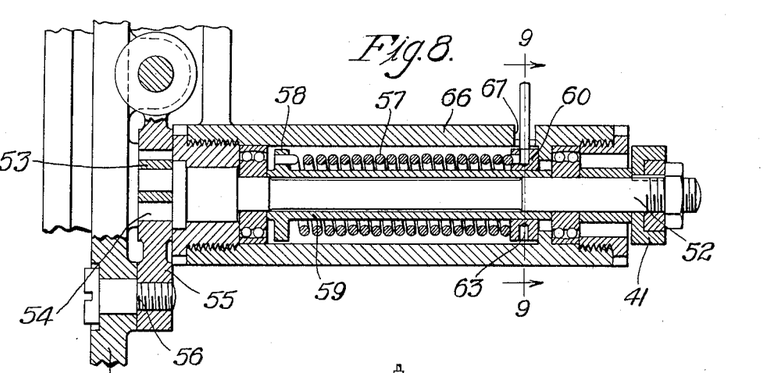
Fig. 8 is an enlarged detail sectional view through the supply spool lever arm mechanism.

Figs. 5, 6, and 7 illustrate the mechanism for causing the wire to traverse the surface of the rollers to more evenly distribute the wear thereon and for the supplying of air under pressure to the faces of the rollers. Mounted on the shaft 23 is a gear 138 which meshes with a gear 139 on a vertical shaft 140 which carries at its upper end a worm 141 which drives a worm gear 142. The worm gear 142 is fixed to a shaft 143 on which is fixed a heart-shaped cam 144.

Mounted above the rolling units and running the full length of the machine is a rotatable air tube 145 having distributing pipes 147 leading therefrom and down to a point above the center and between each pair of rollers. The end of the distributing pipe is flattened except in the center where a small opening 148 is left for the escape of air under pressure onto the faces of the rollers which cools and cleans them. On the flattened end of the distributing pipe 147 and on each side of the air outlet 148 is fixed a pin 149. The wire 38 is threaded between these pins 149 on its way to be rolled. Fastened to the air tube 145 is a roller arm 150 which carries at one end a roller 151 which engages the face of the cam 144. A spring 152 fastened to the arm 150 keeps the roller 151 in engagement with the face of the cam 144. The movement of the cam 144 gives to the distributing pipe 147 a slow oscillating motion which serves to guide the wire as it is being rolled back and forth over the face of the rollers, thereby more evenly distributing the wear and preventing grooves thereon. Figs. 6 and 7 are enlarged details showing the means for clamping the distributing pipe onto the air tube.

Figure 16:
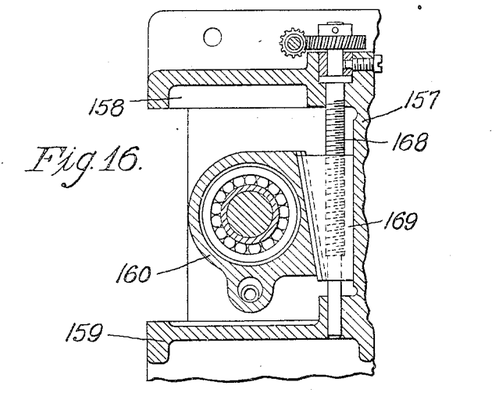
Fig. 16 is a fragmentary section through the machine showing mechanism for keeping the faces of the rollers parallel.

The rolling unit 21, as shown in Figs. 15 and 16, comprises a driving roller 155 and an idle roller 156. A stationary housing 157 surrounds the driving roller 155 and projecting from it are lips 158 and 159 between which a housing 160 for the idle roller 156 is guided. To adjust the pressure between the rollers 155 and 156 a spring 161 is provided which acts on levers 162 and 163 which are mounted at the forward end of the idle roller 156. To adjust the pressure between the rollers a thumb screw 166 is turned.

By turning a hand wheel 167, shown in Figs. 1 and 15, which through suitable gearing operates a screw 168 to raise or lower a wedge-shaped block 169 which is suitably guided between the stationary housing of the driven roller 155 and the housing of the idle roller 156, as shown in Fig. 16, the rear end of the housing can be adjusted to enable a parallel setting of the rollers. The front end of the housing is held in such a manner that it cannot shift endways.

Figures 13, 14:
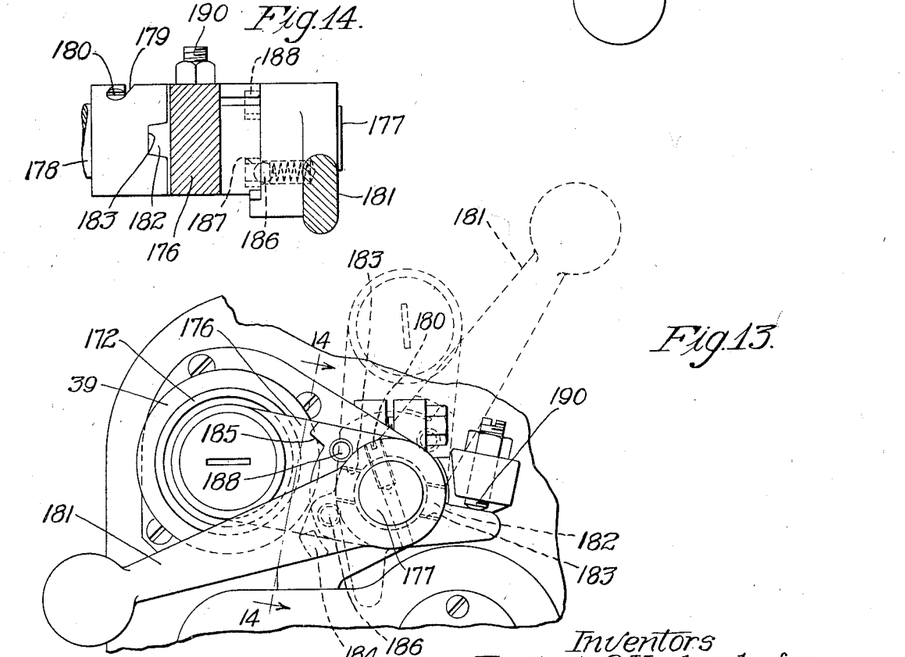
Fig. 13 is a side view of the mechanism shown in Fig. 12.
Fig. 14 is a detail section taken on the line 14—14 of Fig. 13.

The method and mechanism for removably supporting the outside bearing of the supply spool shaft 70 is illustrated in Figs. 12, 13, and 14. The supply spool shaft 70 projects from the housing of the supply spool mechanism and terminates in a reduced end in a cone-shaped tip 171. Screw threaded on the shaft 70 just inside the tip is a collar 172 equipped with a cone-shaped projection 173 which projects into an opening 174 in the supply spool and clamps it on the shaft 70. The cone-shaped tip 171 on the shaft 70 enters a similarly shaped recess 175 in an anti-friction bearing fitted in one end of an arm 176 which is free to rotate and slide on a movable shaft 177 projecting from the housing of the supply spool mechanism. Surrounding the shaft 177 and forming a bearing therefor and clamped within the housing and also projecting therefrom is a sleeve 178 which abuts against the arm 176. The projecting end of the sleeve 178 which abuts against the arm 176 is enlarged and provided with a cam groove 179 in which a pin 180 secured in the shaft 177 rides when a handle 181 secured thereto is moved upward. The cam groove 179 is so shaped that the pin 180 in advancing in its slides the shaft 177 outward, which movement slides the arm 176 carrying the anti-friction bearing away from the cone-shaped tip 171 of the supply spool shaft 70 just enough to clear it. Centering and positioning lugs 182 project from one side of the arm 176 and engage recesses 183 in the stationary sleeve 178. At the end of the longitudinal movement of the arm 176 the lugs 182 are drawn from the recesses 183. A lug 184 on the handle 181 engages a shoulder 185 on the arm 176 at the end of its longitudinal movement and thereafter a continued movement upward of the handle 181 carries the arm 176 upward enough to clear the outside diameter of the collar 172, as shown in dotted lines in Fig. 13.

A spring catch 186 carried in a recess in the arm is drawn from engagement with a recess 187 in the bearing arm 176 at the beginning of its upward movement and at the end of the horizontal movement engages a second recess 188 in the bearing arm 176 which locks the arm 176 and handle 181 together so that when the handle 181 is in its upper position the bearing arm 176 will be held up and out of the way of the spool.

The collar 172 may now be unscrewed from the shaft 70, the wound spool removed, and an empty one put on. The handle 181 is now pulled forward and down to its lower position. An adjustable stop 190 for the handle is mounted from the housing of the supply spool mechanism.

What is claimed is:

1. In a mechanism for winding strands, a take-up spool to receive the strand, a supply spool, friction driving means for the supply spool, and means responsive to the tension in the strand for varying the driving engagement of the friction driving means to control the speed of rotation of the supply spool.

2. In a mechanism for winding strands, a tape-up spool to receive the strand, a supply spool, a spindle therefor, a driving shaft, a pair of frictionally engaging means interposed between the driving shaft and the spindle for driving the spindle from the shaft, and means responsive to the tension in the strand for varying the pressure between the frictionally driving means to control the speed of the supply spool.

3. In a mechanism for winding strands, a take-up spool to receive the strand, a supply spool, a spindle for the supply spool, a disk operatively connected with said spindle, a driving disk in engagement with the disk on the spindle, a pivotal arm movable in response to the tension on the strand leading from the supply spool, and operative connections between said pivotal arm and the driving disk for varying the driving pressure between said disks to maintain the tension on the strand substantially constant.

4. In a machine for working strands or cords, a supply spool, a take-up spool, driving means for said spools, and means for controlling said driving means to maintain a substantially constant tension on the strand or cord between said spools.

5. In a machine for working strands or cords, a supply spool, driving means for said supply spool, a take-up spool, driving means for said take-up spool, and means responsive to the tension in the strand or cord for controlling said driving means and thereby the tension of the strand or cord between the supply and take-up spools.

6. In a machine for working strands or cords, supply and take-up spools, a friction driving mechanism for each of said spools, and a tensioning arm for each of said driving mechanisms operated in response to the tension in the strand or cord to increase or decrease the pressure of said friction driving means to thereby govern the tension of the strand or cord between the supply and take-up spools.

7. In a machine for working strands or cords, supply and take-up spools, a friction driving mechanism for each of said spools, and lever arms for each of said driving mechanisms operated by the tension in strand or cord to increase or decrease the speed of driving of said spools to compensate for varying diameters thereof.

8. In a machine for working strands or cords, a power driven supply spool, a take-up spool, and means for varying the speed of the supply spool to maintain a constant tension on the strand or cord between the supply and take-up spools.

9. In a machine for working strands or cords, a supply spool, power driving means for said supply spool including friction disks, and a pivotal lever over which the strand or cord runs from the supply spool said lever being operatively connected with said friction disks to vary the driving pressure thereof in response to variations in tension of the cord or strand.

10. In a machine for working strands or cords, a power driven supply spool, a brake, a lever arm controlled by slight changes in the tension of the strand or cord to control the speed of the supply spool and by sudden changes caused by breakage of the strand or cord to apply the brake to stop the rotation of said supply spool.

11. In a machine for working strands or cords, power driven supply and take-up spools, lever arms controlled by the tension of the strand or cord between spools to control the speed of rotation of said spools, and clutch operating mechainsm controlled by one of said lever arms to stop the operation of the machine in case the strand or cord breaks.

12. In a machine for working strands or cords, power driven supply and take-up spools, mechanism responsive to the tension on the strand or cord for controlling the speed of said supply and take-up spools to maintain a constant tension on said strand or cord between spools, and clutch mechanism operated when the take-up spool is filled to stop the operation of the machine.

13. In a machine for working strands or cords, power driven supply and take-up spools, mechanism responsive to the tension on the strand or cord for controlling the speed of said spools ot maintain a constant tension on said cord or strand between said spools, a brake mechanism operated in response to the breaking of the cord or strand to stop the rotation of said supply spool, and clutch mechanism operated in response to the breaking of the strand or cord to disengage said clutch mechanism and stop the machine.

14. In a machine for working strands or cords, supply and take-up spools means for driving said spools, and means operated when one of said spools has made a predetermined number of revolutions to stop the operation of said driving means.

15. In a machine for working strands or cords, supply and take-up spools, means for driving said spools, mechanism responsive to the tension on the strand or cord for controlling the speed of said supply and take-up spools to maintain a constant tension on said strand or cord between the spools, and clutch mechanism operated when the take-up spool has made a predetermined number of revolutions to stop the said driving mechanism.

16. In a machine for rolling tinsel strands, a rolling mechanism, a supply spool, a take-up spool, driving means for said supply spool, and means responsive to the tension in the strand for varying the speed of the said supply spool.

17. In a machine for rolling tinsel strands, a rolling mechanism, supply and take-up spools, driving means for each of said spools, and means responsive to the tension in the strand for controlling said driving means to maintain the proper tension of the strand on each side of said rolling mechanism.

18. In a machine for rolling tinsel strands, power driven supply and take-up spools, means responsive to the tension of the strand on each side of the rolling mechanism for controlling the speed of rotation of said spools, and mechanism controlled by said means to stop the operation of the rolling mechanism and the said spools in case the strand breaks.

19. In a machine for working strands or cords, a take-up device, driving mechanism for said take-up device, means responsive to the tension of the strand for varying the speed of said take-up device, and mechanism controlled by said means for stopping the operation of the take-up device in case the strand or cord breaks.

20. In a machine for working strands or cords a take-up spool, driving means therefor including friction disks and a pivotal lever over which the strand or cord runs, said lever operatively connected with said friction disks to vary the driving pressure thereof in response to variations in the tension of the cord or strand, and means associated with said lever for stopping the operation of the take-up spool in case the strand or cord breaks.

21. In a machine for working strands or cords, a take-up spool, driving means therefor including friction disks and a pivotal lever over which the strand or cord runs, said lever operatively connected with said friction disks to vary the driving pressure thereof in response to variations in the tension of the cord or strand, and a clutch operating mechanism associated with said lever to stop the operation of the machine in case the strand or cord breaks.

22. In a mechanism for working metallic strands or cords, a take-up device for the strand, friction driving means for the take-up device, and means responsive to the tension in the strand for operating the friction driving means to vary the speed of the take-up device.

23. In a mechanism for working metallic strands or cords, a take-up spool for the strand, friction driving means for the take-up spool, and means responsive to the tension in the strand for varying the driving engagement of the friction driving means to vary the speed of rotation of the take-up spool.

24. In a mechanism for working metallic strands or cords, a take-up spool for the strand, a spindle therefor, a driving shaft, a pair of frictionally engaging means interposed between the driving shaft and the spindle for driving the spindle from the shaft, and means responsive to the tension in the strand for varying the pressure between the friction driving means to control the speed of the take-up spool.

25. In a mechanism for working metallic strands or cords, a take-up spool for the strand, a spindle for the take-up spool, a disk operatively connected with said spindle, a driving disk in engagement with the disk on the spindle, a pivotal arm movable in response to the tension on the strand leading to the take-up spool, and operative connections between said pivotal arm and the driving disk for varying the driving pressure between said disks to maintain the tension on the strand substantially constant.

26. In a mechanism for working metallic strands or cords, a supply spool for the strand, friction driving means for the supply spool, and means responsive to the tension in the strand for operating the friction driving means to vary the speed of the supply spool.

27. In a mechanism for working strands or cords, means for working the said strand, a take-up device for the worked strand, friction driving means for the take-up device, and means responsive to the tension in the strand for operating the friction driving means to vary the speed of the take-up device to maintain a constant tension on the strand between the strand working means and the take-up device.

28. In a mechanism for working strands or cords, means for working the strand, a supply spool for the strand to be worked, friction driving means for the supply spool, and means responsive to the tension in the strand for operating the friction driving means to vary the speed of the supply spool to maintain a constant tension on the strand between the supply spool and the said working means.

29. In a machine for working strands or cords, means for working and feeding the strand, a take-up spool for the worked strand, means for maintaining a uniform tension in the strand between the take-up spool and said working and feeding means, and mechanism controlled by said means for stopping the operation of said working and feeding means in the event that the strand breaks.

30. In a mechanism for working strands or cords, means for working and feeding the strand, a take-up spool for the worked strand, driving mechanism for said take-up spool, means responsive to the tension in the strand for varying the speed of said take-up spool, and mechanism controlled by the said means for stopping the operation of said working and feeding means in the event that the strand breaks.

31. In mechanism for working strands or cords, means for working and feeding the strand, a take-up spool, friction driving means for the take-up spool, means responsive to the tension in the strand for operating the friction driving means to vary the speed of the take-up spool to maintain a constant tension on the strand between the strand working and feeding means and the take-up spool, and mechanism controlled by the said tension controlled means for stopping the operation of the strand working means in the event that the strand breaks.

32. In a mechanism for working strands, means for working said strands, a take-up device for the worked strand, driving means for said working means and take-up device, a distributing mechanism operatively connected with the driving mechanism for the take-up device, and means for varying the speed of the take-up device responsive to the tension on the strand between the working means and said take-up device.

33. In a mechanism for working strands, means for working said strands, a take-up device, means for driving said take-up device, a distributing mechanism operated by said driving means, and mechanism to control said driving means to vary the speed of the take-up device, said control means being responsive to variations in the tension of the worked strand.

34. In a mechanism for working strands, means for working said strands, a take-up device, friction driving means for the take-up device, distributing mechanism driven by said driving mechanism, and mechanism for varying the driving pressure of the friction driving means in response to variations in the tension of the worked strand.

35. In a mechanism for working strands, means for working said strands, a take-up spool, a spindle therefor, driving mechanism, a friction clutch between the spindle and driving mechanism, a distributing mechanism driven from said spindle, and levers controlled by the tension of the strand for varying the pressure of the friction clutch to vary the speed of the spindle.

In witness whereof, I hereunto subscribe my name this 17th day of June A. D., 1920.

FREDERIC S. KOCHENDORFER.

In witness whereof, I hereunto subscribe my name this 8th day of June A. D., 1920.

JOHN N. SELVIG.